United States Patent [19]

Tagawa

[11] 4,287,525

[45] Sep. 1, 1981

[54] MULTI-PIN RECORD ELECTRODE ASSEMBLY AND DRIVING METHOD OF THE SAME

[75] Inventor: Takao Tagawa, Kashihara, Japan

[73] Assignee: Sharp Kabushiki Kaisha, Osaka, Japan

[21] Appl. No.: 943,870

[22] Filed: Sep. 19, 1978

[30] Foreign Application Priority Data

Sep. 21, 1977 [JP] Japan ............................ 52-116203
Sep. 22, 1977 [JP] Japan ............................ 52-129096[U]
Aug. 28, 1978 [JP] Japan ............................ 53-105325

[51] Int. Cl.³ .................. G01O 15/06; G03G 13/00
[52] U.S. Cl. .......................... 346/155; 346/139 C; 346/162
[58] Field of Search .............. 346/155, 156, 139 C, 346/162, 163, 165, 153

[56] References Cited

U.S. PATENT DOCUMENTS

| | | | |
|---|---|---|---|
| 3,470,563 | 9/1969 | Starr | 346/155 |
| 3,624,661 | 11/1971 | Shebanow | 346/155 |
| 4,082,619 | 4/1978 | Dehnert | 346/155 |

FOREIGN PATENT DOCUMENTS

2605154  4/1977  Fed. Rep. of Germany ........... 346/155

*Primary Examiner*—Vincent P. Canney
*Attorney, Agent, or Firm*—Birch, Stewart, Kolasch & Birch

[57] ABSTRACT

A multi-pin record electrode assembly comprises two series of record electrodes formed on the same substrate and folded to form a zigzag pattern with respect to each other. The electrodes are formed on a flexible substrate having a fold line separating the substrate into two substrate portions. Each substrate portion has an electrode set and its associated leads formed thereon. The substrate is folded along the fold line to produce the record electrode assembly.

9 Claims, 18 Drawing Figures

MULTI-PIN RECORD ELECTRODE ASSEMBLY AND DRIVING METHOD OF THE SAME

BACKGROUND OF THE INVENTION

1. Filed of the Invention

The present invention relates to a multi-pin electrode assembly employed as an electrographic recording device and a driving method of the same. The multi-pin electrode assembly has high allignment density of a plurality of pin-shaped stationary record electrodes.

2. Description of the Prior Art

Figure 1:
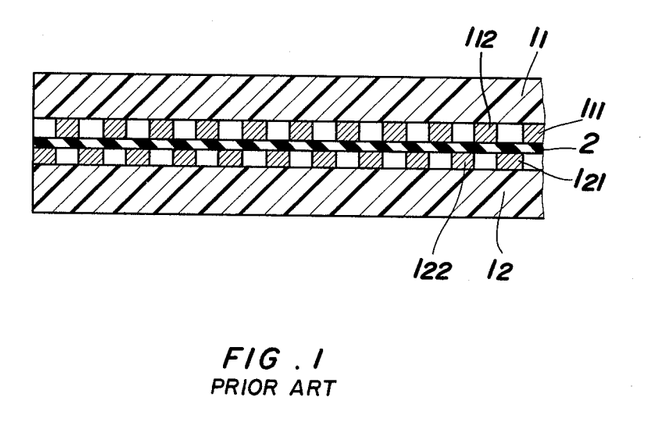
FIG. 1 is a cross-sectional view of a conventional multi-pin electrode assembly showing a plurality of record electrodes.

A conventional multi-pin electrode assembly is, for example, illustrated in FIG. 1, wherein two recording or printing head substrates $1_1$ and $1_2$ made of a dielectric plate or dielectric film are adhered to each other. The two recording or printing head substrate $1_1$ and $1_2$ carry respective equally spaced record electrodes $1_{11}$ and $1_{12}$, $1_{21}$ and $1_{22}$, respectively. An insulating layer 2 is inteposed between the two arrays of record electrodes $1_{11}$ and $1_{12}$, $1_{21}$ and $1_{22}$ which are equally spaced in a zigzag pattern. The two recording or printing head substrates $1_1$ and $1_2$ are separated from each other.

However, it was impossible to provide a high accuracy of placement of the two recording or printing head substrates due to variations in manufacturing conditions or misalignment.

OBJECTS AND SUMMARY OF THE PRESENT INVENTION

Accordingly, it is the primary object of the present invention to provide an improved multi-pin electrode assembly where a plurality of record electrodes are alinged with high precision.

It is another object of the present invention to provide an improved multi-pin electrode assembly where only one recording or printing head substrate is provided which carries a plurality of equally spaced, two-storied record electrodes in a zigzag pattern.

It is still another object of the present invention to provide an improved multi-pin electrode assembly where an auxiliary rigid substrate is formed on a recording or printing head substrate which carries a plurality of equally record electrodes in a zigzag pattern, whereby the auxiliary rigid substrate can strengthen the record or printing head substrate.

It is further object of the present invention to provide a novel driving method for a multi-pin electrode assembly which carries at least two series each having a plurality of equally spaced record electrodes, where the two series of the equally spaced record electrodes are simultaneously driven according to the present driving method.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to one embodiment of the present invention, only one integral recording or printing head substrate is provided which carries two series of a plurality of equally spaced record electrodes. A series of record electrodes is arranged at a half area of the recording or printing head substrate. A series of record electrodes is aligned in such a manner as to form a zigzag pattern together with another series of record electrodes. The composed record or printing head substrate is folded at the boundary of the two series of record electrodes. An insulating layer is provided for spacing the two series of record electrode.

To strengthen the recording or printing head substrate, an auxiliary rigid plate is combined with the recording or printing head substrate made of, for example, a resilient film in another preferred form of the present invention.

The resulting multi-pin electrode assembly is driven by the present driving method, where the two series of record electrodes are scanned alternatively, in accordance with a specific memory and timing control circuit of the present invention. The memory stores video signals which are to be applied to the subsequent series of record electrodes, while the video signals are applied to the other series of record electrodes. The timing control circuit functions to read out the video signals stored in the memory and apply the same to the other series of record electrodes.

BRIEF DESCRIPTION OF THE DRAWINGS

The present invention will become more fully understood from the detailed description and given hereinbelow and the accompanying drawings which are given by way of illustration only, and thus are not limitative of the present invention and wherein.

DESCRIPTION OF THE PREFERRED EMBODIMENTS

Although a multi-pin electrode assembly of the present invention is applicable to an electrographical recording device such as a thermal printing, an electrostatic recording or the like, only the electrostatic recording is described herein for the sake of convenience.

Figure 2:
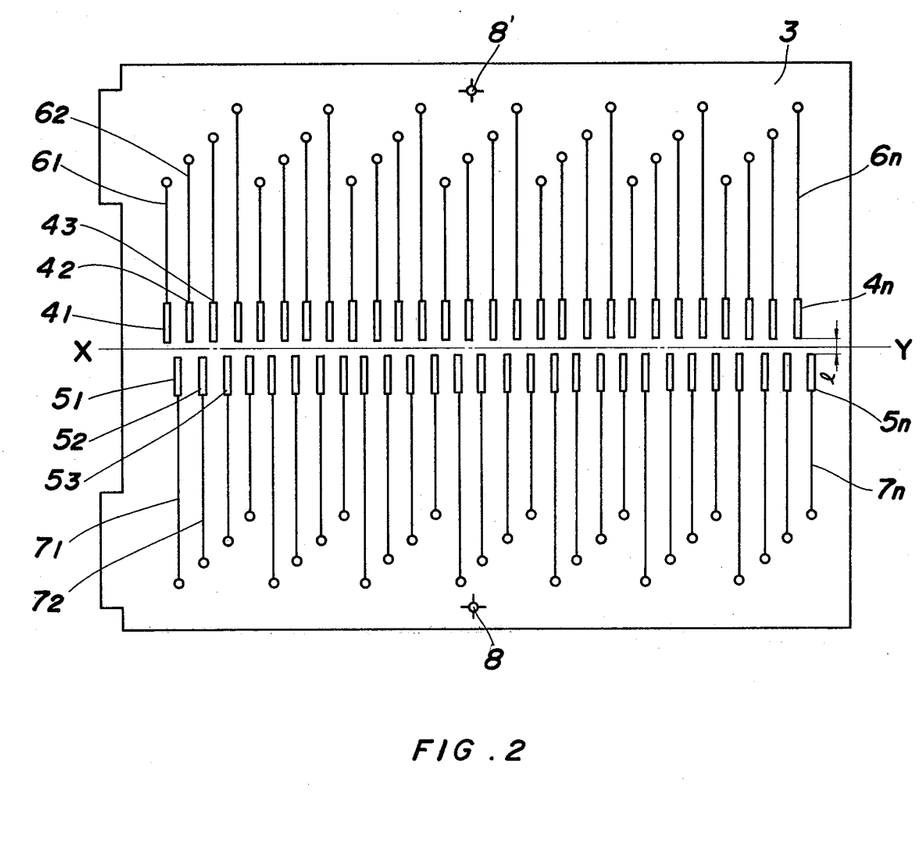
FIG. 2 is a top view of a master film adapted to the present invention.

FIG. 2 shows a master film 3 in a top view. The master film 3 is provided for composing patterns $4_1$ to $4_n$ and $5_1$ to $5_n$ for a plurality of equally spaced record electrodes and patterns $6_1$ to $6_n$ and $7_1$ to $7_n$ for lead lines on a record or printing head substrate of a flexible printed circuit board. The two series of patterns $4_1$ to $4_n$ and $5_1$ to $5_n$ for the record electrodes are, respectively, aligned on the half area of the master film 3 spaced by the center line X-Y. The situation is the same as the two series of patterns $6_1$ to $6_n$ and $7_1$ to $7_n$. The patterns $4_n$ and $5_n$ are both separated from the center line X-Y at an interval of l/2. The two series of the patterns $4_n$ to $5_n$ are physically shifted the width of each pattern with respect to each other. In other words, the two series of patterns $4_n$ and $5_n$ are composed in a zigzag pattern with respect to each other so that they form a zigzag pattern of the record electrodes in the multi-pin electrode assembly of the present invention.

The patterns $4_n$ and $5_n$ are divided to a plurality of groups each consisting of a predetermined number of the patterns $4_n$ and $5_n$, in a preferred form, four patterns $4_n$ and $5_n$. The length of the patterns $6_n$ relates to a group of the four patterns $4_n$ is subsequently changed while the length of the another patterns $7_n$ relates to a group of the four patterns $5_n$ is also subsequently changed in such a manner as to be symmetric to the length of the patterns $6_n$. When the record electrodes and the lead lines are confronted with the other record electrodes and the lead lines, capacitance defined by the record electrodes and the lead lines becomes uniform. A pair of patterns 8 and 8' for pin holes are formed on the master film 3 for precisely positioning the master film 3 while it is folded.

Figure 3:
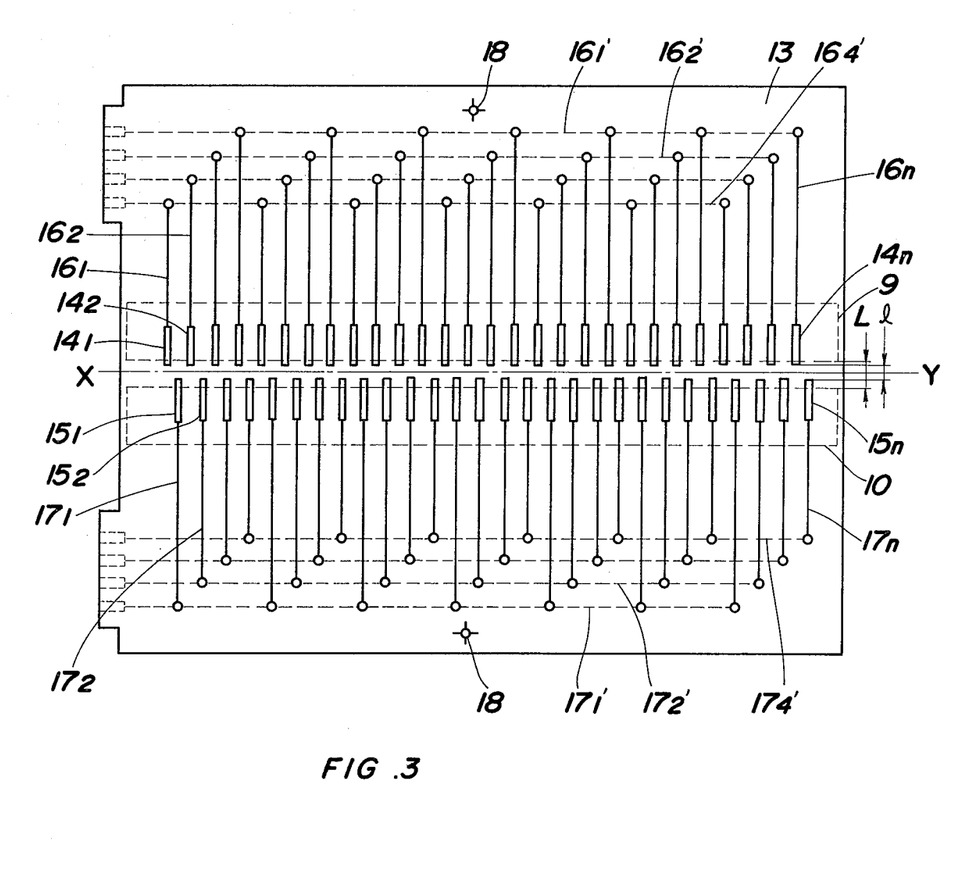
FIG. 3 is a top view of a printed wire board of a multi-pin electrode assembly according to the present invention.

FIG. 3 illustrates conductive patterns formed on a printed circuit board (P.C.) 13 using the master film 3 shown in FIG. 2. The P.C. 13 is preferably a flexible plate made of, for example, polyimide. A photosensitive material covers the P.C. board 13, whereby record electrodes $14_n$ and $15_n$ and lead lines $16_n$ and $17_n$ are patterned by a conventional photo etching process, screen printing or the like, according to the patterns formed on the master film 3. Two metal films 9 and 10 are arranged on the back of the P.C. board 13 for facilitating the manufacturing process of the conductive patterns and enhancing the recording characteristic of the recording head. The two metal films 9 and 10 are respectively spaced from the center line X-Y at L/2 (L>l). The heads of the record electrodes $14_n$ and $15_n$ are mechanically protected by the two metal films 9 and 10. The metal films 9 and 10 prevent P.C. board 13 from shrinking to prevent damage to the conductive patterns while the photo etching process is conducted.

A series of second lead lines $16_1'$ to $16_4'$ are commonly connected to the respective lead lines $16_n$ through through-holes formed within the P.C. board 13 at the tips of the lead lines $16_n$, the lead lines 16 having equivalent positioning in their groups of the lead lines 16. Another series of second lead lines $17_1'$ to $17_4'$ is the same as the above. Terminals of the second lead lines $16_1'$ to $16_4'$ and $17_1'$ to $17_4'$, are formed on the edge of the P.C. board 13, where the recording head is connected to another instrument for driving purposes.

Figure 4:
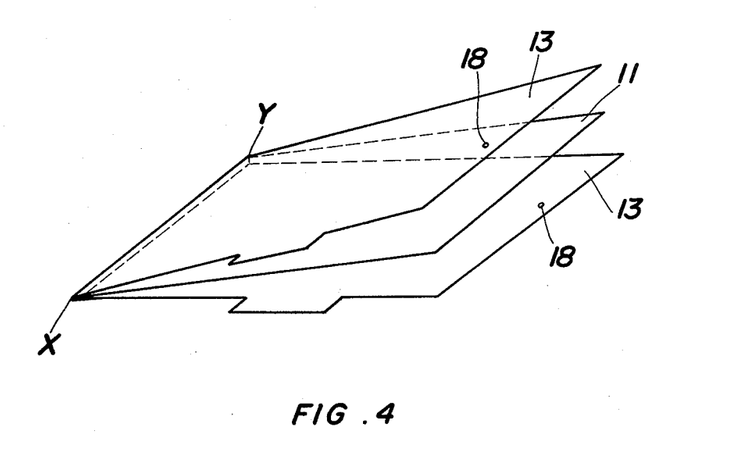
FIG. 4 is a perspective view of the multi-pin electrode assembly shown in FIG. 3 showing a folding process.

The P.C. board 13 is folded at the center line X-Y to compose the recording head as best shown in FIG. 4 so that the record electrodes $14_n$ and $15_n$ and the lines $16_n$ and $17_n$ are confronted through a thin spacer 11. The pin holes 18 and 18' functions to facilitate and enhance the positioning in the folding process.

A folding line is formed along the center line X-Y to facilitate the folding process.

Figure 5:
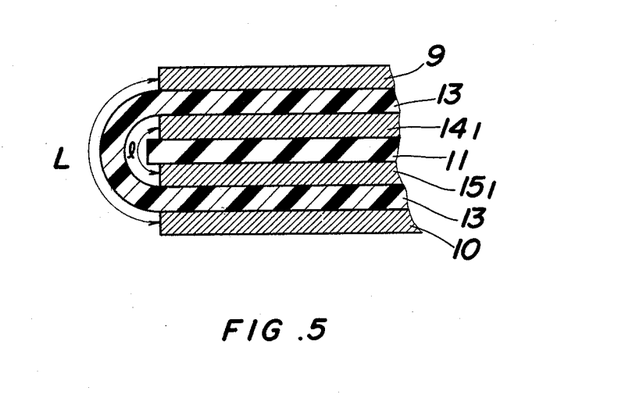
FIG. 5 is a cross-sectional view of a center portion of the folded multi-pin electrode assembly.

FIG. 5 shows the tip of the record head beside the center line X-Y in a cross-sectional view on an enlarged scale. As best shown in FIG. 5, the following relationship is most preferable between the spacings L and l, the spacer 11, the record electrodes $14_n$ and $15_n$, and the P.C. board 13.

$$l = \frac{\pi}{2} (a + 2t)$$

$$L = \frac{\pi}{2} (a + 2b + 2t)$$

wherein a, b, and t are the thickness of the spacer 11, and the P.C. board 13, and the record electrodes $14_n$ and $15_n$, respectively.

It is preferable that the values of the spacings L or l be from one half to twice the above most preferable values defined by the above equations.

The record electrodes $14_n$ and $15_n$ are arranged in a zigzag pattern by the above-mentioned folding process. It is an important process in the folding process that the P.C. board 13 is adhered to itself through the spacer 11. An insulating material such as lacquer can be substituted for the plate-shaped spacer 11. The opposed surface of the P.C. board 13 is covered with the insulating material before it is folded.

Figure 6:
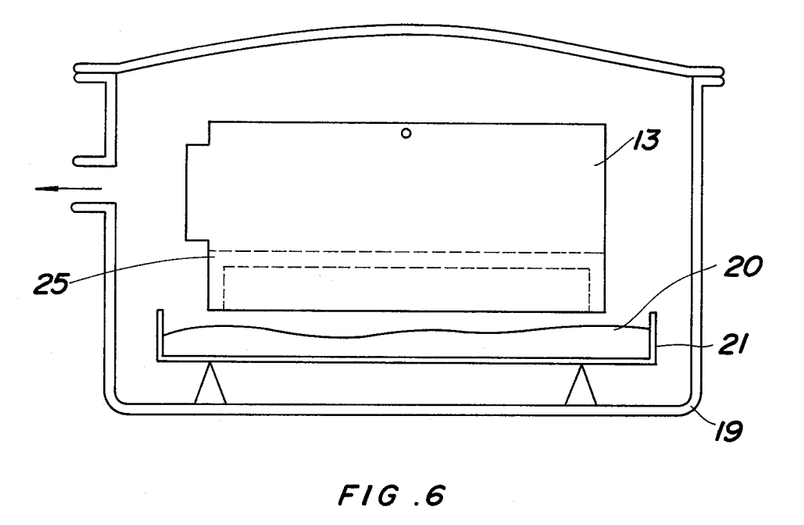
FIG. 6 is a cross-sectional view of an apparatus for providing the folding process of the present invention.

FIG. 6 illustrates an apparatus for conducting the adhesion process of the folded P.C. board 13. The P.C. board 13 is coated with adhesive except on the tips of the record head beside the center line X-Y. In other words, the area 25 of the P.C. board 13 enclosed by dashed lines has the adhesive. The P.C. board 13 is adhered to each other through the spacer 11.

The P.C. board 13 is positioned within a vacuum container 19 of a vacuum system. A pan 21 containing adhesive such as epoxy resin 20 is also disposed within the vacuum container 19. At first, the P.C. board 13 is separated from the epoxy resin 20. The vacuum container 19 is placed into high vacuum conditions. Therefore, bubbles contained within the epoxy resin 20 or the P.C. board 13 are removed. Thereafter, the tip of the record head e.g. P.C. board 13 is slowly deposited in the epoxy resin 20. The vacuum operations are terminated to make the vacuum container 10 atmospheric pressure.

The epoxy resin 20 is injected into the P.C. board 13 through the folding line, the epoxy resin containing no bubble of such as a gas or the like. If the bubble remains beside the record electrodes $14_n$ or $15_n$, the bubble reduces the value of voltage applied to the record electrodes $14_n$ or $15_n$. Sometimes, the recording head may be damaged. The manufacturing process described above is suitable for the mass production of high quantities of the record head because only one master film 13 is utilized for conducting the photo etching process to the only one P.C. board 13 and, thereafter, the P.C. board 13 is folded to compose the recording head.

The metal films 9 and 10 can be removed by etching process. Otherwise, they are effectively available for the following features. An electrostatic capacity is produced between the record electrodes $14_n$ and $15_n$ and the metal films 9 and 10 by holding the metal films 9 and 10 at a ground or a predetermined voltage. According to the electrostatic capacity, an induced voltage is reduced which is produced beside the adjacent record electrodes $14_n$ or $15_n$ by the now switching record electrodes $14_n$ or $15_n$, as follows.

The induced voltage $V'$ produced on the record electrode j is written by the following equation.

$$V' = \frac{C_1}{C_1 + C_2} V$$

wherein V is the voltage of the now switching record electrode i, $C_1$ is the electrostatic capacity between the record electrode i and the adjacent record electrode J, and $C_2$ is the electrostatic capacity between the metal films 9 and 10 and the record electrodes i and j.

The effect of the reduction of the induced voltage can be expected at an auxiliary electrode side when the auxiliary electrode is utilized for conducting the electrostatic recording.

At the tip of the recording head of the P.C. board 13, the recording electrode $14_n$ and $15_n$ form the zigzag pattern spaced by the spacer 11 which is very thin. Therefore, it is not preferable that a terminal portion of the record head be also manufactured at the same thickness as the tip of the recording head because the terminal portion is connected to another driving instrument.

Figure 7:
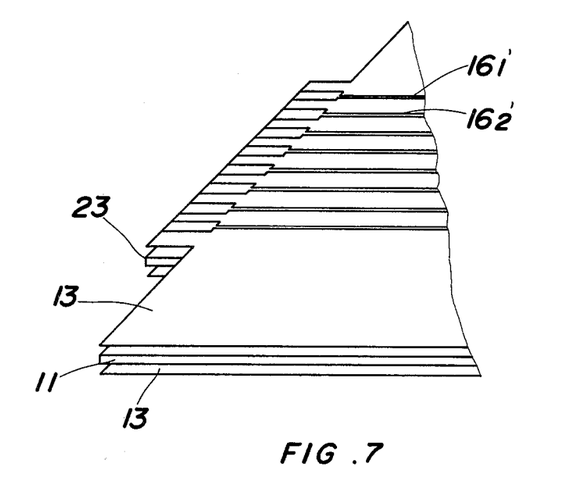
FIG. 7 is a perspective view of a connector portion of the printed wire board of the present invention.

FIG. 7 shows a preferred form of the terminal portion where an auxiliary spacing plate made of, for example, babelite resin is provided for appropriately spacing the P.C. board 13.

The recording head including the record electrodes $14_n$ and $15_n$ is molded by suitable synthetic resin for fixing and protecting purposes. Unnecessary synthetic resin for exposing the tip of the recording head and the P.C. board 13 beside the center line X-Y are both removed by polishing process to provide the multi-pin electrode assembly of the present invention.

In another preferred form of the present invention, an auxiliary rigid film is attached to the flexible P.C. board 13. This another preferred form of the present invention is described hereinafter with reference to the drawings.

Figure 8:
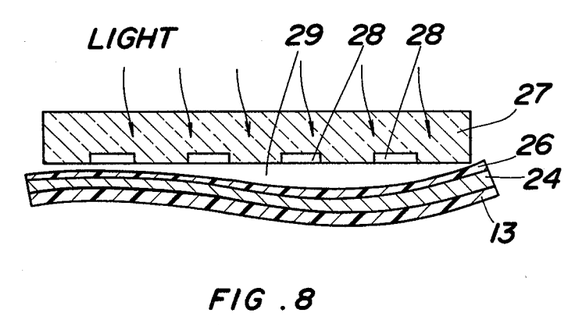
FIG. 8 is a cross-sectional view of the master film illustrating an exposuring process adapted to the present invention.

FIG. 8 illustrates the exposuring procedure of the photo etching process adapted to the P.C. board 13 of the present invention as previously described. A photo resist 26 is coated on the P.C. board 13. A master pattern 27 made of, for example, glass material is disposed on the photo resist 26 for producing patterns corresponding to patterns 28 formed on the master pattern 27 in accordance with the exposuring procedure. A mask is produced on the photo resist 26 disposed on the P.C. board 13 by the master pattern 27, the mask being utilized for etching a metal film 24.

A spacing 29 is unavoidably produced due to the flexibility of the P.C. board 13 as best shown in FIG. 8. The spacings 29 reduce the accuracy of the etching process thereby reducing the high integration of the recording head.

Figure 9:
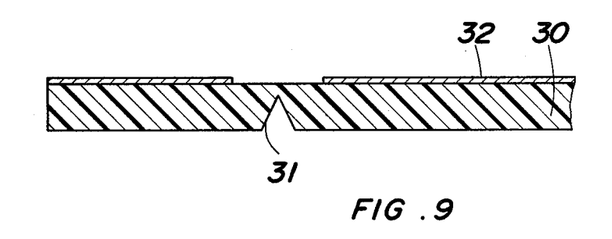
FIGS. 9 and 10 are cross-sectional views of a conventional multi-pin electrode assembly.
Figure 10:
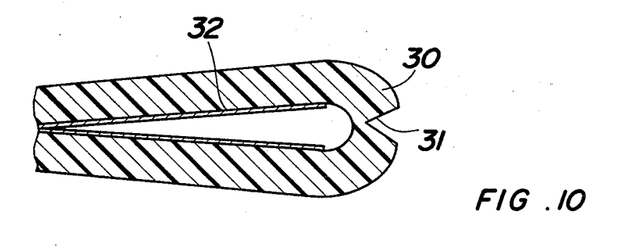

FIG. 9 illustrates another construction of the P.C. board 30 of the type where the P.C. board 30 comprises a rigid plate. A notch 31 is formed in the P.C. board 30 for readily folding the P.C. board 30. A metal film 32 is disposed on the P.C. board 30. The metal film 32 undergoes the abovementioned etching process. However, the P.C. board 30 may be broken by the folding process. Otherwise, the P.C. board 30 inevitably widens beside the center of the folding line as best shown in FIG. 10. Thus it is impossible to manufacture a suitable recording head.

Figure 11:
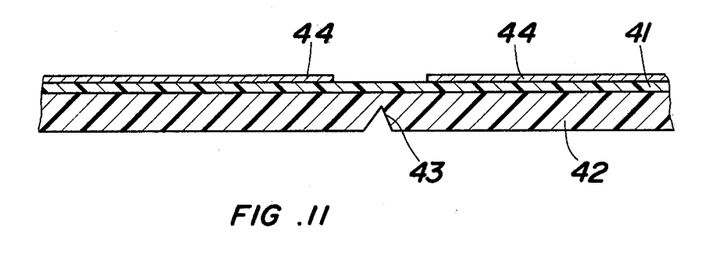
FIGS. 11 to 13 are cross-sectional views of another multi-pin electrode assembly according to the present invention.

FIG. 11 shows a construction of the P.C. board in another preferred embodiment of the present invention, wherein the P.C. board comprises a flexible film 41 made of, for example, polyimide with a thickness of 20–100 μm and a rigid printed wire board 42 made of, for example, glass epoxy resin. The rigid printed circuit board 42 has toughness coefficient larger than the flexible film 41. A notch 43 is formed in the rigid printed circuit board 42 for facilitating the folding process applied to the combination of the flexible film 41 and the rigid printed circuit board 42. A metal film 44 made of, for example, copper is disposed on the flexible film 41. The metal film 44 is processed with the photo etching process so that a plurality of conductive patterns are formed on the flexible film 41. The conductive patterns are similar as shown in FIG. 3.

Figure 12:
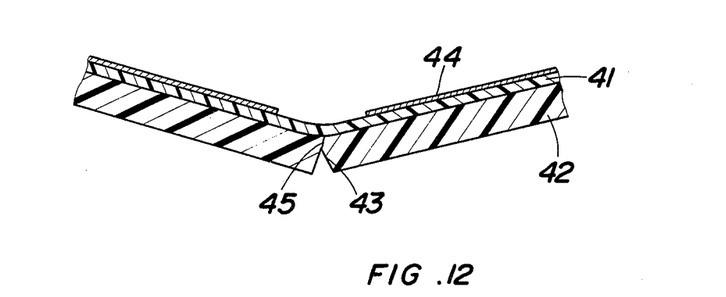

The P.C. board comprising the flexible film 41 and the rigid printed circuit board 42 is folded to compose the record head of the present invention as viewed in FIG. 12. Cracks 45 are unavoidably produced within the rigid printed circuit board 42 due to the hardness of the same. However, the cracks 45 can not extend into the flexible film 41 because of the flexibility of the flexible film 41.

Figure 13:
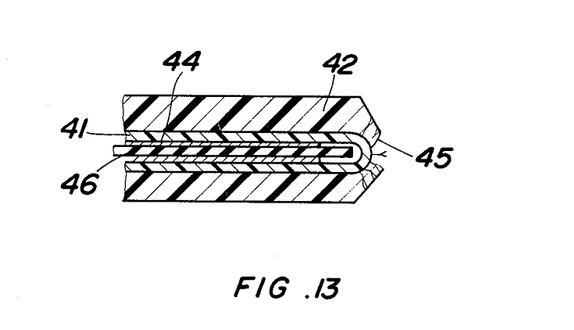

The recording head shown in FIG. 13 is derived from the abovementioned manufacturing procedures as illustrated in FIGS. 11 and 12. An insulating layer 46 is provided for spacing the metal films 41.

Figure 14:
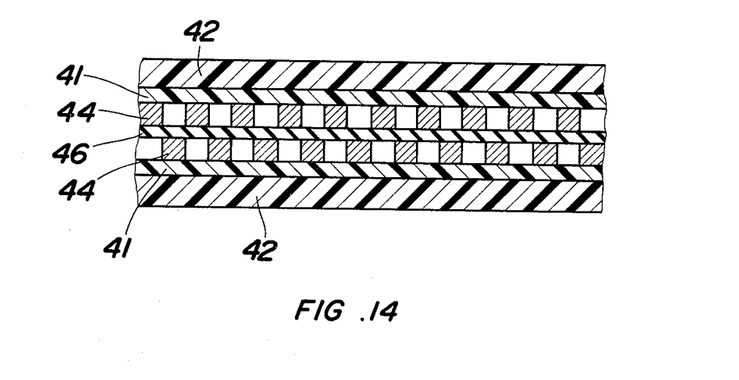
FIG. 14 is a cross-sectional view of the multi-pin electrode assembly shown in FIGS. 11 to 13 showing a plurality of record electrodes.

The recording head shown in FIG. 14 comprises a plurality of recording electrodes in the zigzag pattern as similar as in FIG. 1. The record head depicted in FIG. 14 is manufactured by the similar manufacturing process as described previously with reference to FIGS. 2 to 7.

Attention is directed to an improved driving method of the abovementioned recording head of the present invention described hereinafter. The driving method of the present invention is described utilizing the recording head having an auxiliary electrode behind the record or printing head substrate although this embodiment not limited by the construction of the recording head.

Figure 15:
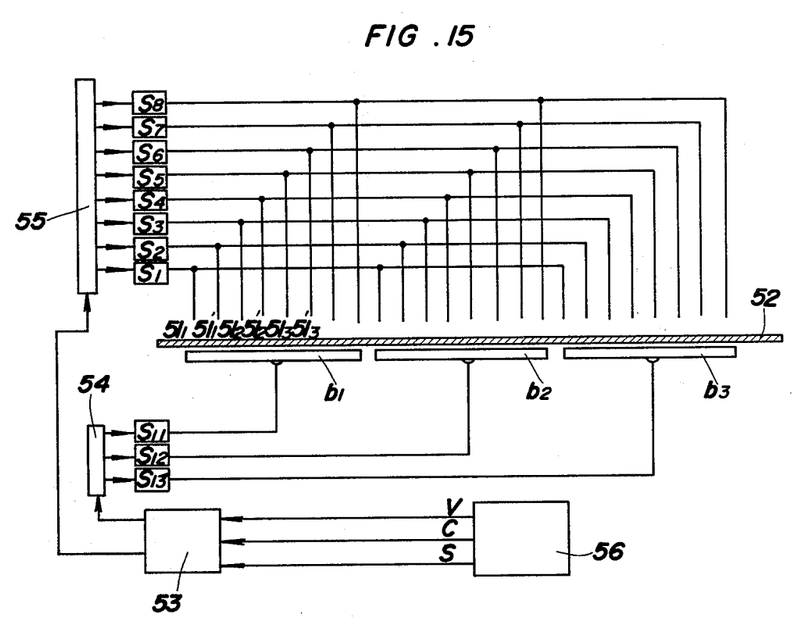
FIG. 15 is a schematic wiring diagram of a principle electrographic recording device.
Figure 16:
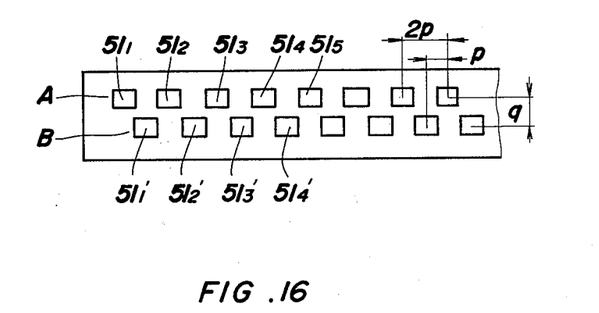
FIG. 16 is a top view of an enlarged scale of the record electrodes of the present invention.

FIG. 15 illustrates a block diagram of a conventional driving system for a conventional recording head. A logic circuit 53 receives video signals V, clock signals C, and synchronizing signals S. Picture element signals as the video signals V are impressed in serial to the logic circuit 53 in this description. It is possible to apply the picture element signals in parallel to the logic circuit 53 with a plurality of bits. A conversion circuit be required to convert parallel information to serial information, the conversion circuit being included within the logic circuit 53.

In FIG. 15 a plurality of record electrodes are referred to $51_1$, $51_1'$, $51_2$, $51_2'$ and so forth. Such record electrodes are related to the above-mentiond record electrodes $14_n$ and $15_n$, respectively. A plurality of auxiliary electrodes $b_1$, $b_2$ and $b_3$ are disposed behind the record electrodes $51_1$, $51_1'$, and so forth.

A recording paper 52 is positioned between the record electrodes 51, $51_1'$ and so on and the auxiliary electrodes $b_1$, $b_2$ and $b_3$. A plurality of switching circuits $S_1$ to $S_8$ are provided for controlling applied voltages to the recording paper 52. A voltage of approximately $-300$ V is impressed to the recording paper 52 by the switching circuits $S_1$ to $S_8$ at the on conditions. Another series of switching circuits $S_{11}$, $S_{12}$, and $S_{13}$ functions to control applied voltages to the auxiliary electrodes $b_1$ to $b_3$. A voltage of approximatey $+300$ V is applied to the auxiliary electrodes $b_1$ to $b_3$ at the on conditions.

It is assumed that recording operations are carried out by signals derived from a signal generator 56 using the record electrodes $51_1$, $51_1'$, $51_2'$ and so on except for the record electrodes $51_2$. The switching circuit $S_3$ should be turned off while the remaining switching circuits $S_1$, $S_2$, $S_4$ and so forth should be turned on. Simultaneously the switching circuit $S_{11}$ should be turned on while the remaining switching circuits $S_{12}$ and $S_{13}$ are turned off.

Figure 17:
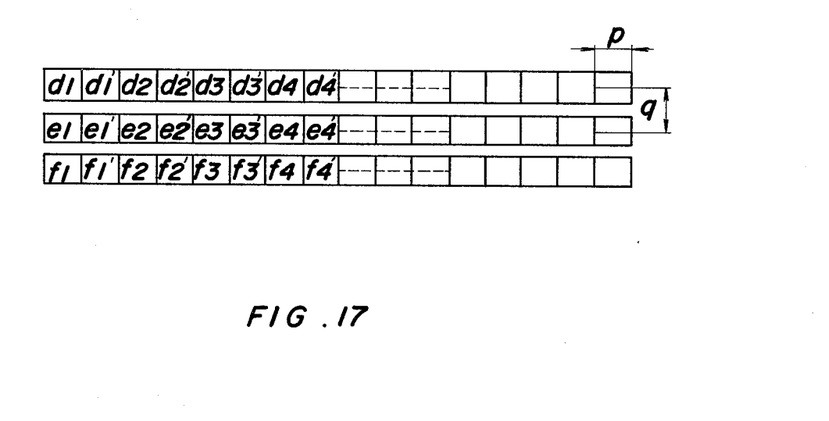
FIG. 17 is a schematic record pattern adapted to a driving method of the present invention.

When it is further assumed that a record pattern depicted in FIG. 17 is carried out, the two series of record electrodes $51_1$, $51_1'$. $51_2$, $51_2'$ and so on are alternatively scanned in accordance with the conventional driving method. That is, odd-numbered record electrodes of the first series of record electrodes $51_1$, $51_2$, $51_3$ and so on are firstly scanned and, thereafter, even-numbered record electrodes are driven. Odd-numbered record electrodes of the second series of record electrodes $51_1'$, $51_2'$, $51_3'$ and so forth are subsequently scanned and, thereafter, even-numbered record are driven. Two cycles of scanning operation are required to record data corresponding to a line so that recording rate of the recording head becomes a half of another type of the recording head including a line of the recording electrodes.

The present driving method, now, is described with reference the drawings in detail.

Figure 18:
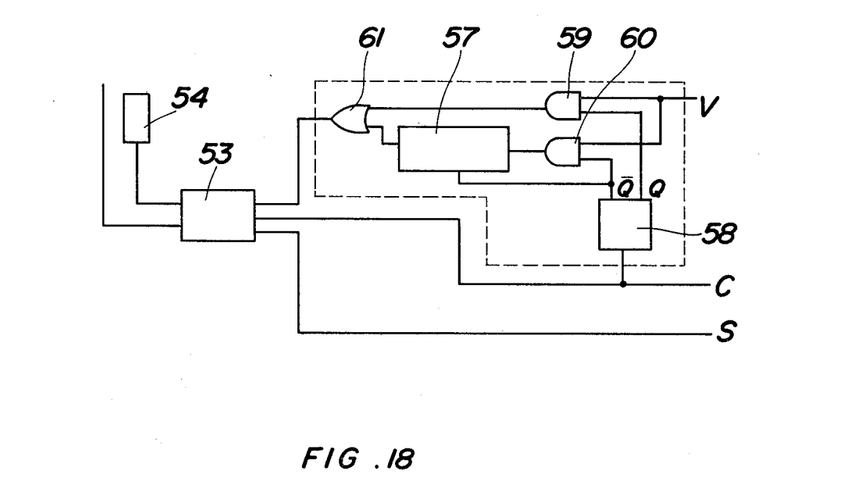
FIG. 18 is a block diagram of a circuit configuration of a driving method of the present invention.

A circuit enclosed by dashed lines in FIG. 18 is coupled between the signal generator 56 and the logic circuit 53 shown in FIG. 15. AND gates 59 and 60 have the video signals V. A flip-flop 58 recieves the clock signals C and develops the outputs Q and $\overline{Q}$ respectively applied to the AND gates 59 and 60. The video signals transferred from the AND gate 59 is applied to the logic circuit 53 through an OR gate 61. The video signals developed from the AND gate 60 is transferred to a shift register 57 to be applied to the logic circuit 53 through the OR gate 61 after once stored in the shift register 57.

The shift register 57 is wired so that it memorizes video signals corresponding to at least one line data of the two series of the record electrodes $51_1$, $51_1'$ and so forth. The output $\overline{Q}$ generated from the flip-flop 58 is applied to the shift register 57 so as to control shift operation of the shift register 57.

In operation, it is assumed that the record pattern shown in FIG. 17 is carried out. The signal generator 56 develops subsequently two series of video signals $f_1$, $f_1'$, $f_2$, $f_2'$, ... $f_n$, $f_n'$ and $e_1$, $e_1'$, $e_2$, $e_2'$ ... $e_n$, $e_n'$ in the order that the record operations are carried out. Odd-numbered video signals $f_1$, $f_2$, $f_3$ and so forth are firstly scanned through the AND gate 59 and the OR gate 61 using the clock signals C and the flip-flop 58. Even-numbered video signals $f_1'$, $f_2'$, $f_3'$ and so on are once stored in the shift register 57 by the clock signals C and the flip-flop 58.

Since the shift register 57 has storage capacity corresponding to a series of record electrodes $51_1$ to $51_n$, information according to odd-numbered video signals is utilized for recording purposes while information according to even-numbered video signals is stored in the shift register 57 when information for the first series of record electrodes $51_1$ to $51_n$ is developed. Under these circumstances the recording paper 52 is advanced at a length q.

Thereafter, information applied to the second series of record electrodes $51_1'$ to $51_n'$ is generated from the signal generator 56. At that time, odd-numbered video signals $e_1$, $e_2$, $e_3$ and so forth are applied to odd-numbered switching circuits $S_1$, $S_3$, $S_5$, and so on. Simultaneously, the shift register 57 develops the stored even-numbered video signals $f_1'$, $f_2'$, $f_3'$ and so on. Therefore, the OR gate 61 receives alternatively the even-numbered video signals $f_1'$, $f_2'$, $f_3'$ and so on and the odd-numbered video signals $e_1$, $e_2$, $e_3$ and so forth. Even-numbered switching circuits $S_2$, $S_4$, $S_6$ and so on have the above-mentioned video signals $f_1'$, $f_2'$, $f_3'$, $e_1$, $e_2$, $e_3$ and so on.

As the switching circuits $S_{11}$, $S_{12}$ and $S_{13}$ are subsequently driven, dot positions corresponding to $f_1'$, $f_2'$, $f_3'$ and so on of the first series of record electrodes are recorded between the intervals of dot positions corresponding $f_1$, $f_2$, $f_3$ and so on of the same and, simultaneously, the dot positions corresponding to $e_1$, $e_2$, $e_3$ and so on of the second series of record electrodes are recorded. The shift register 57 develops the information for the even-numbered dot positions corresponding to $f_1'$, $f_2'$, $f_3'$ and so on of the first series and, simultaneously, stores the information for the even-numbered dot positions corresponding to $e_1'$, $e_2'$, $e_3'$ and so on of the second series. When the first series of record electrodes has completed the recording for the information of the odd-numbered dot positions corresponding to $e_1$, $e_2$, ... $e_n$, the second series of record electrodes has simultaneously completed the recording for the information of the dot positions corresponding to $f_1'$, $f_2'$, $f_3'$ and so on. Then the shift register 57 stores the information for the even-numbered dots positions corresponding to $e_1'$, $e_2'$, $e_3'$ and so on of the second series.

As described above, data for even-numbered dot positions in a scanning record line are being stored in the shift register 57 when the data for odd-numbered dot positions in the same are being recorded. Simultaneously, the data for the even-numbered dot positions in the preceding scanning record line are being recorded alternatively together with the data for the odd-numbered dot positions in the above-mentioned scanning record line. The present driving method achieves the recording at two times the rate of the above-mentioned conventional driving method.

The data for the even-numbered data positions at the last record line may remain within the shift register 57 while the data for the odd-numbered data positions of the same are completely recorded. To eliminate the problem, it is necessary to be absence of the data for the data positions at the last scanning record line. An auxiliary advancement of the recording paper 52 may be available for causing the absence of the data for the data positions at the last scanning record line. Otherwise, the signal generator 56 is wired so as to provide additional signals for causing the absence of the data after the recording operations are completed.

Although the shift register 57 is utilized for conducting delay operations, a pair of random access memories (RAM) can be substituted for the shift register 57. One of the RAMs receives the information for the data positions while the other provides the information for the data positions previously stored.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A multi-pin record electrode assembly comprising:
   an insulating substrate folded into two substrate portions along a fold line; and
   first and second electrode sets formed on said substrate along said fold line, said first electrode set including a plurality of closely spaced electrodes arranged at a predetermined distance from each other along a first side of said fold line, said second electrode set including a plurality of closely spaced electrodes arranged at said predetermined distance from each other along a second side of said fold line, said second electrode set being offset along said fold line from said first electrode set approximately one half said predetermined distance said electrodes of each set are spaced from each other;
   said substrate being folded so as to form a record electrode assembly having an edge formed along said fold line, said first and second electrode sets having alternating electrodes presented along said edge.

2. The electrode assembly of claim 1, wherein said first and second substrate portions each have inner surfaces juxtaposed to each other when said substrate is folded, said inner surace of said first substrate portion being folded to lie substantially coplanar to the inner surface of said second substrate portion.

3. The electrode assembly of claim 2, wherein said first and second electrode sets are formed on the inner surfaces of said first and second substrate portions, respectively.

4. The electrode assembly of claim 3, further comprising:
   an insulating film disposed between the inner surfaces of said first and second substrate portions for electrically isolating said first and second electrode sets from each other.

5. The electrode assembly of claim 2, further comprising:
   lead lines connected to each electrode of said first and second electrode sets, each of said lead lines extending perpendicularly from said fold line and parallel to each other.

6. The assembly of claim 2, further comprising:
   a shield disposed on the outer surface of each of said first and second substrate portions to electrostatically isolate said first and second electrode sets.

7. The multi-pin record electrode assembly according to claim 1, wherein said substrate is flexible.

8. The assembly of claim 1, further comprising:
   an auxiliary substrate bonded to the outer surface of said substrate portions, said auxiliary substrate being relatively rigid.

9. The electrode assembly of claim 1, wherein each of said electrodes has a width along said fold line approximately equal to said predetermined distance between adjacent electrodes, said electrodes of said first and second electrode sets alternating so as to substantially continuously cover the length of said fold line upon which said first and second electrode sets are disposed.

* * * * *